United States Patent [19]

Daberko

[11] 4,055,376

[45] Oct. 25, 1977

[54] CALIBRATION RETICLE FOR MEASURING MICROSCOPES

[75] Inventor: Gunter W. Daberko, Placentia, Calif.

[73] Assignee: Rockwell International Corporation, El Segundo, Calif.

[21] Appl. No.: 618,981

[22] Filed: Oct. 2, 1975

[51] Int. Cl.² .......................................... G02B 27/32
[52] U.S. Cl. .................................. 350/10; 33/125 A; 73/1 R
[58] Field of Search ................... 350/10, 41; 356/163, 356/156, 120, 171, 243; 33/125 A; 73/1 R

[56] References Cited

U.S. PATENT DOCUMENTS

| 2,457,170 | 12/1948 | Mitchell | 356/163 |
| 3,068,743 | 12/1962 | Dyson | 356/163 |
| 3,229,103 | 1/1966 | Rautsch et al. | 33/125 A |

FOREIGN PATENT DOCUMENTS 1,035,990  7/1966  United Kingdom ................ 350/172

OTHER PUBLICATIONS

Gage, *The Microscope*, 15th Ed., Comstock Pub. Co., Ithaca, N.Y., 1932, pp. 295–301.

*Primary Examiner*—John K. Corbin
*Assistant Examiner*—Matthew W. Koren
*Attorney, Agent, or Firm*—H. Fredrick Hamann; G. Donald Weber, Jr.; Robert Ochis

[57] ABSTRACT

A calibration reticle for measuring microscopes is disclosed in which a calibrated distance is established by calibration reference lines whose locations are defined by selected features of the calibration pattern. Preferably, the calibration reference lines are not physically manifest on the calibration reticle, except by the selected features which specify the locations of the calibration reference lines.

13 Claims, 11 Drawing Figures

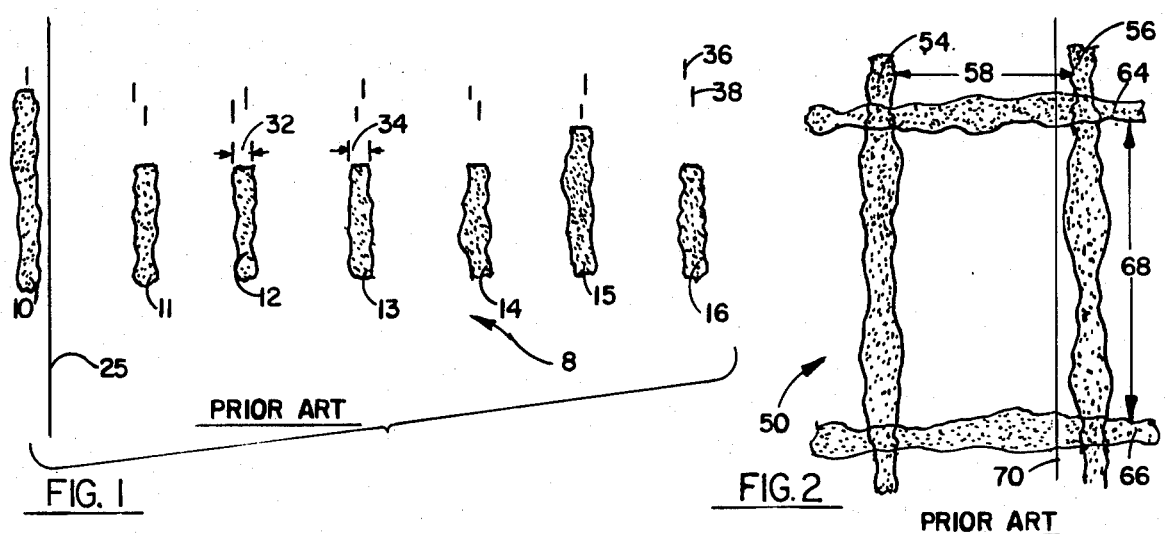
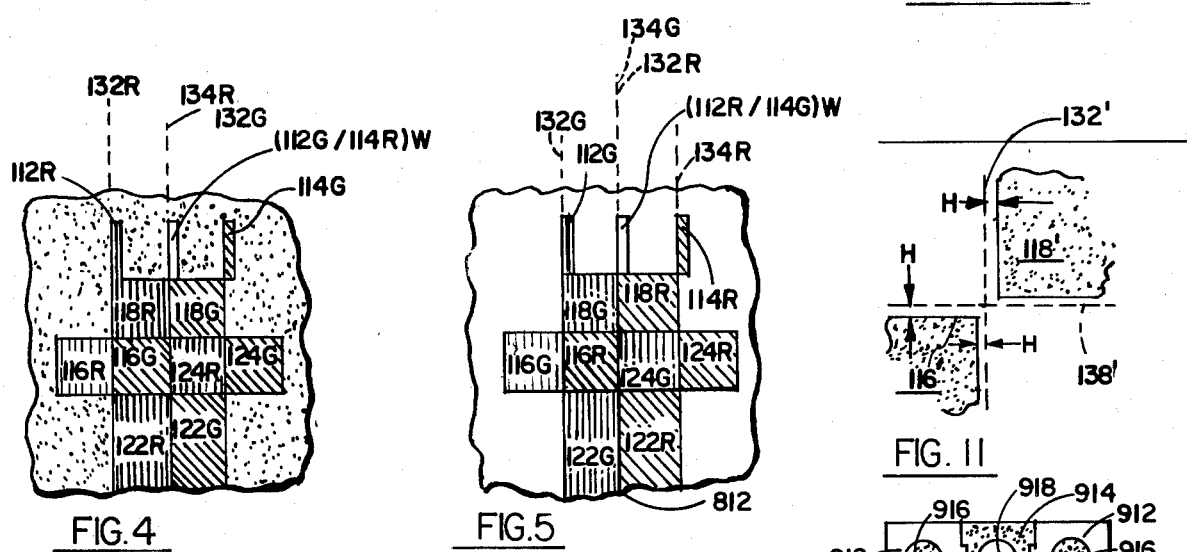
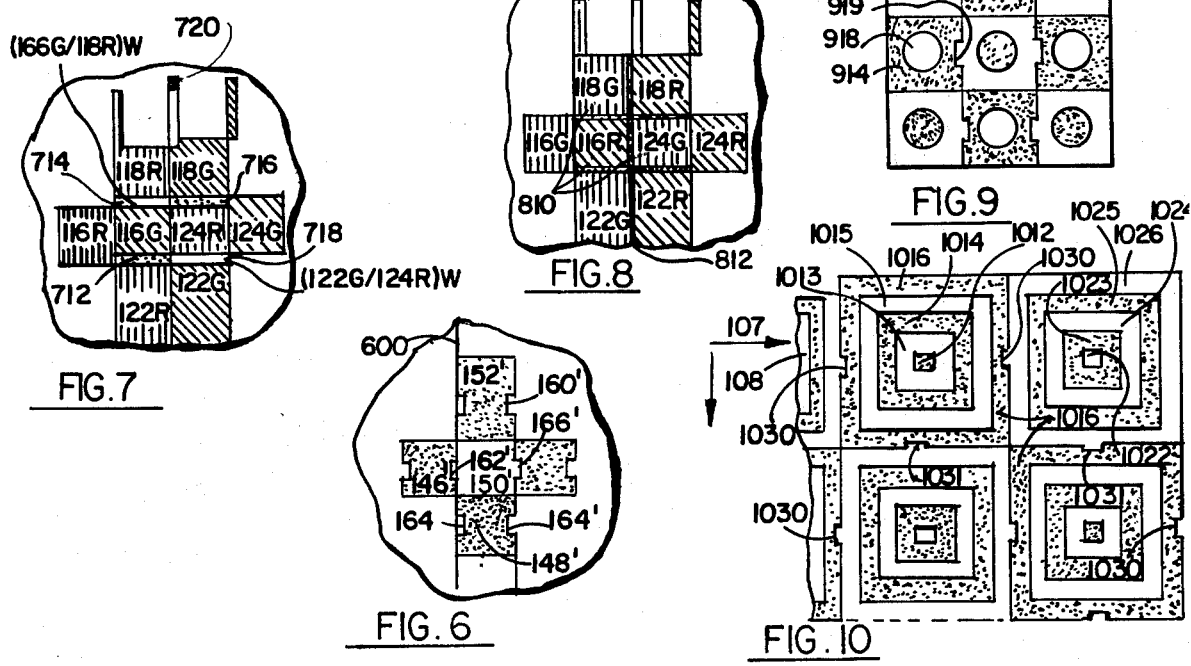

CALIBRATION RETICLE FOR MEASURING MICROSCOPES

BACKGROUND OF THE INVENTION

1. Field of the Invention

This invention relates to the field of calibration reticles for measuring microscopes.

2. Prior Art

Accurate, and even more important consistent, calibration of geographically separated measuring microscopes has become of great importance as a result of the wide diversification of the semiconductor industry. There are many mask production facilities scattered throughout the world which are in the business of fabricating masks to the order of customers. In some instances, linewidths in the finished masks are narrow enough and specified to a sufficient degree of accuracy that the tolerance allowed in the mask linewidth is less than the tolerance in the calibration of a measuring microscope whose calibration has been established using a prior art calibration reticle.

Prior art calibration reticles have utilized narrow scribed lines on the calibration reticle to define calibration distances. These calibration reticles induce operator error during calibration because the scribe lines, at calibration magnifications, are observed to be of varying width and ragged and because calibration using these reticles requires operator judgment as to where the edge of the line is. When calibrations are performed utilizing these prior art calibration reticles the calibration error can exceed the tolerance required of mask dimensions in fabricating state of the art semiconductor devices.

When a customer requiring a mask specifies a dimension and tolerance, the mask making facility may actually generate a mask having exactly the specified dimension as measured by the measuring microscopes in its quality control facility. However, because of differeing microscope calibration, the incoming inspection department of the customer may measure the masks as being out of tolerance.

A scribed line or other calibration reticle which utilizes the edge of a mark on the reticle as a calibration reference requires that the microscope be meticulously focused in order for accurate calibration to be achieved because even slight defocusing changes the apparent position of the edge of the mark.

A further problem with scribed line calibration reticles is the cost associated with need to individually calibrate the line spacing in order that the reticle will be an accurate calibration reference.

A calibration reticle is needed which minimizes the quantity of error introduced into a calibration via operator judgments and operator errors and consistenly yields calibrations having a tolerance which is less than the tolerance allowed in mask linewidths.

SUMMARY OF THE INVENTION

A calibration reticle in accordance with the present invention overcomes the problems of the prior art calibration reticles by providing calibration marks which do not require the operator to determine the location of the edge of a line. Rather, the calibration reticle utilizes a series of barlike marks (bars) positioned in such a manner that for proper calibration, the operator positions a calibration reference object (a hairline or sheared image) in a location where the calibration reference object is equidistant from the edge of selected bars of the calibration reticle. A calibration reticle of this type substantially reduces the sensitivity of calibration to inexact focus because the centering of the calibration reference with respect to the selected bars of the calibration reticle is only minimally affected by an appearance change in the edge of one of the bars. The calibration reticle preferably comprises a checkerboard-like pattern of bars.

With the preferred calibration reticle, calibration of a filar microscope is achieved by centering the hairline of the eyepiece along a calibration reference line equidistant from the edges of diagonally adjacent bars of the checkerboard-like pattern as a first reference position. The location of the calibration reference line is defined by the position of the bars and preferably is not otherwise physically manifested on the reticle. Nex, (while measuring displacement) the hairline is moved to another calibration reference line as a second reference position. The separation between the first and second reference positions is specified on the calibration reticle. Comparison of the separation specified on the calibration reticle and the measured displacement provides a calibration of the displacement measuring mechanism of the microscope.

Calibration of an image shearing microscope is preferably achieved by centering in an interlocking manner a selected feature of one sheared image with respect to a different feature of the other sheared image as a first reference position. Then (while measuring displacement) the first sheared image is moved to reverse the interlock of the images.

In the first reference position, a selected calibration reference line in the one sheared image is aligned with a selected calibration line in the other sheared image. In the second reference position a selected calibration reference line in the one sheared image is aligned with a selected calibration reference line in the other sheared image, where the selected calibration line in at least one of the images is different in the first and second reference positions. The separation between the first and second reference positions is specified on the calibration reticle. The calibration of the microscope is determined by comparing the separation specified on the calibration reticle with the measured displacement.

BRIEF DESCRIPTION OF THE DRAWINGS

FIG. 1 illustrates a prior art scribed line calibration reticle in which a range of dimensions are defined by successive scribe lines.

FIG. 2 illustrates another type of prior art scribed line calibration reticle.

FIG. 4 is an illustration of the image in an image shearing microscope in a first position assumed during calibration.

FIG. 5 is an illustration of the image in an image shearing microscope in a second position assumed during calibration.

FIG. 6 illustrates the image in a filar microscope in a first position assumed during the calibration.

FIG. 7 is an illustration of the image appearing in an image shearing microscope when the calibration reticle is off angle with respect to the shearing mechanism.

FIG. 8 illustrates an image observed in an image shearing microscope under surface illumination.

FIGS. 9 and 10 illustrate a few of the many alternative configuration for a calibration reticle in accordance with the invention.

FIG. 11 illustrates the position of a calibration reference line with respect to selected features of the calibration pattern.

DETAILED DESCRIPTION OF THE PREFERRED EMBODIMENT

Figure 3:
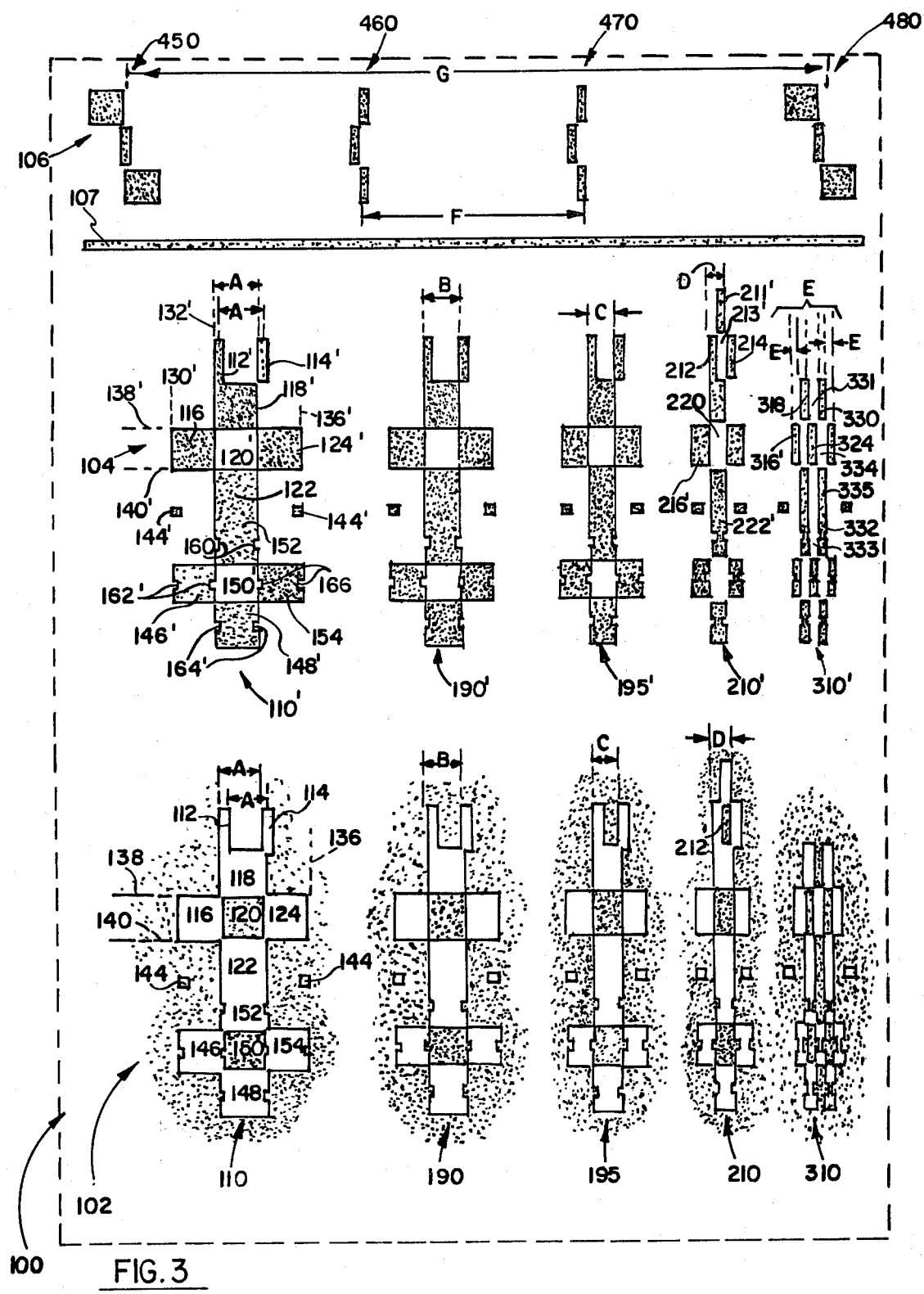
FIG. 3 is a plan view of a calibration reticle in accordance with the present invention.

A prior art calibration reticle utilizing a scale of scribed lines is illustrated generally at 8 in FIG. 1. Successive scribed lines 10-16 are illustrated. As illustrated by the width 32 of line 12 and the width 34 of line 13, the actual width of the scribed lines can vary in accordance with the hardness of the material being scribed and variations in the stylus pressure. The successive scribed lines are subject to positioning errors as a result of the inability of the scriber control system to accurately increment the position of the scriber where calibration line spacings on the order of 0.4 mil or less are required. The resulting inaccurate scribed line positioning is illustrated by the displacement of the actual centers 38 of successive scribed lines from their intended positions 36. Thus, when utilizing the scale of scribed lines for calibration purposes, the calibration is subject to the errors in the positioning of the scribed lines. A further problem with scribed lines is that their ragged edges create a problem in determining where the edge of the scribed line is. Substantial operator judgment is required in determining the position of a hairline 25 which corresponds to the edge of a line such as scribe line 10.

A second type of prior art calibration reticle is illustrated generally at 50 in FIG. 2. The calibration reticle 50 comprises a pair of substantially parallel vertical scribed lines 54 and 56. Lines 54 and 56 have a predetermined nominal displacement 58. However, because of variations in stylus pressure and material characteristics the width of the lines varies and the edges of the lines are often ragged. These variations in the lines make accurate, repeatable, measurements by different operators difficult to achieve. The reticle 50 further includes a second pair of substantially parallel scribed lines 64 and 66 oriented perpendicular to the lines 54 and 56. The lines 64 and 66 have a predetermined nominal separation 68, different than the nominal separation 58 between lines 54 and 56. However, lines 64 and 66 have the same line width variation and raggedness problems as lines 54 and 56. In the calibration reticle 50, the spacing between pairs of scribed lines 54 and 56 and 64 and 66 varies from reticle to reticle. Consequently, the spacing of the lines on each reticle must be measured in order to certify the reticle. This significantly increases the cost of such a reticle.

A composite preferred embodiment of a calibration reticle in accordance with the present invention is illustrated generally at 100 in FIG. 3. Reticle 100 includes a calibration segment illustrated generally at 102 which for substage illumination is a negative of the calibration pattern, a corresponding calibration segment illustrated generally at 104 which for substage illumination is a positive of the calibration pattern, a quick calibration change detection segment illustrated generally at 106 for use with filar microscopes and an orientation bar 107.

Bar 107 can be utilized to achieve accurate alignment of the image of the calibration reticle with respect to the microscope measuring system in order to minimize calibration errors resulting from error in alignment. For accurate calibration to be achieved, displacement of the microscope measuring system during calibration must be parallel to orientation bar 107.

The calibration patterns of segments 102 and 104 are preferably identical, except for the fact that the pattern of segment 102 is a negative of the pattern of segment 104, consequently, the elements of segment 104 have been assigned reference numerals which are identical to the reference numerals of the corresponding elements in segment 102, with the exception that they are primed, i.e. have a "'" following the number. The calibration pattern is comprised of two sets of areas of opposing contrast, a first one of which will produce a bright area in the microscope image and a second one of which will produce dark areas in the microscope image. For use with substage illumination (light transmitted from the far side of the focal plane toward the microscope optics) the first set of areas are preferably transparent and the second set of areas are preferably opaque. For use with surface illumination (light projected from the direction of the microscope optics (i.e. from the near side of the focal plane) toward the object being examined and reflected from the surface of the object being examined back toward the microscope optics) the first set of areas are preferably reflective and the second set of areas are preferably transparent. If in a reticle the side of the opaque areas which is toward the microscope optics is reflective or if the non-reflective areas are transparent, then the reticle may be used with either substage or surface illumination. However, a reticle which with substage illumination yields a negative of the calibration pattern (a pattern which has a dark background with a few bright bars thereon) will with surface illumination yield a positive of the calibration pattern (a pattern with a bright background with a few dark bars thereon).

Segment 102 comprises a plurality of calibration patterns 110, 190, 195, 210 and 310. Calibration pattern 110 is designed for use calibrating a measuring microscope with respect to a distance "A" parallel to the length of bar 107.

Calibration pattern 110 includes two certification bars 112 and 114 which have a center to center spacing of "A". The spacing from the left hand edge of bar 112 to the left hand edge of bar 114 is also "A".

The United States National Bureau of Standard will certify the center-to-center separation between two lines or bars provided that that distance is at least 0.2 mils. The certification bars 112 and 114 are provided in order to simplify the certification of the calibration distance "A" of the calibration pattern 110.

The portion of calibration pattern 110 which appears above the small square bars 144 in the figure is primarily designed for the calibration of image-shearing measurement microscopes. In contrast, the portion of the calibration pattern 110 appearing below the small square bars 144 is primarily intended for use in calibrating measurement microscopes having filar eyepieces.

The upper portion of image 110 comprises four calibration bars 116, 118, 122 and 124 which surround a bar 120 of opposite contrast. Bar 122 continues as a bar 152 below squares 144. The lower portion of bar 122 has been dinominated 152 in order to simplify the description of the lower portion of pattern 110 and in order to clarify the difference between the upper and lower portions of pattern 110. For use with substage illumination bars 112, 114, 116, 118, 122 and 124 are transparent, while bar 120 and the area sorrounding the transparent bars is preferably opaque.

The bars of calibration pattern 110 define a plurality of lines-of-division or calibration reference lines 130, 132, 134 and 136. Calibration reference line 132 is spaced a common distance "H" from a boundary line defined by the boundary between the right hand edge of bar 116 and the left hand edge of bar 120 from the left hand edge of bar 118 the adjacent right hand edge of the area surrounding bar 118 or a boundary between the left hand edge of bar and 122 and the adjacent right hand edge of the surrounding area. Similarly, calibration reference line 134 is spaced the common distance "H" from the right hand edges of bars 118 and 122 and is also spaced the common distance "H" from the left hand edge of bar 124. The calibration reference line 130 is spaced the common distance "H" from the left hand edge of bar 116 and calibration reference line 136 is spaced the common distance "H" from the right hand edge of bar 124. The position of a calibration reference line 132' relative to the position of calibration bars 116' and 118' is illustrated in FIG. 11. The calibration bars 116' and 118' and the calibration reference line 132' correspond to the bars 116, 118 and the calibration reference line 132 of pattern 110 except for a reversal of contrast. The common distance "H" preferably has a small positive value, although it may have a value which is zero or negative. A negative value for "H" corresponds to a slight overlap of bars 116' and 118' parallel to line 138' in FIG. 11. It is preferred that the lower edge of bar 118 and the upper edges of bars 116 and 136 be spaced the common distance "H" from a line-of-division 138 and that the lower edges of bars 116 and 124 and the upper edge of bar 122 be spaced the common distance "H" from the calibration reference line 140.

The separation between the adjacent calibration reference lines 130, 132; 132, 134; and 134, 136 is each the distance "A". Thus, each of the bars 116; 118 and 122; and 124 is of equal width (A-2H) in the direction 107. Similarly, the center-to-center spacing between bar 116 and bars 118 and 122 is the distance "A" as is the center-to-center spacing of bars 118 and 122 and bar 124. Further, since the left hand edge of each of the bars 116, 118, 122 and 124 is spaced from a calibration reference line by the common distance "H" the lefthand-edge to lefthand-edge spacing of diagonally adjacent bars (e.g. 116 and 118) is also "A". Similarly, the center-to-center spacing between certification bars 112 and 114 is "A" as is the lefthand-edge to lefthand-edge spacing of certification bars 112 and 114.

The calibration of an image shearing microscope is most easily accomplished when sheared images of different colors are utilized. Consequently, the following explanation will be with respect to color separated sheared images. For simplicity in the following discussion, it will be assumed that the image shearing microscope divides the image into a green bright image and a red bright image, which when overlapped provide a white image. Further, it will be assumed that the upper portion of negative calibration pattern 110 is to be utilized with substage illumination. Calibration is obtained in the following manner.

First, as illustrated in FIG. 4 the green image (116G) of the bar 116 is centered in the bar 120 of the red image where a "G" following a reference numeral (e.g. 116G) indicates that that portion of the image is green. In each image, the bar 120 will appear black under substage illumination since bar 120 is opaque. Consequently, when the green image (116G) of bar 116 is centered with respect to the "red image" of bar 120, only the green image (116G) of bar 116 will be apparent to the observer, since the lack of light from the "red image" of bar 120 induces no change in the green image of bar 116. Since the bars 116, 118, 122, and 124 which surround bar 120 are all transparent, they will appear red in the red image of pattern 110. Consequently, when bar 116G is centered within bar 120 of the red image, bar 116G will be surrounded by the red images 116R, 118R, 122R and 124R of bars 116, 118, 122 and 124 as illustrated in FIG. 4 where an "R" following a reference numeral (e.g. 116R) indicates that the area is red and a number such as (112G/114R) indicates an overlap of a green image of one bar (e.g. 112) and a red image of another bar (e.g. 114). Such an overlap of green and red results in a white image. Although the above explanation has been phrased in terms of centering bar 116G in the bar 120 of the red image, an operator actually centers bar 116G with respect to bars 116R, 118R, 122R and 124R. It will be noted that this position can also be described as one which the red image 124R of bar 124 is centered with respect to the green images 116G, 118G, 122G and 124G of bars 116, 118, 122 and 124, respectively. The condition in which the bar 116G is centered with respect to bars 116R, 118R, 122R and 124R is a first or initial reference position for distance calibration and the microscope is zeroed in this position (beginning-of-measurement).

The image shearing mechanism is then adjusted to center the green image (124G) of bar 124 within the red image of bar 120 i.e. with respect to images 116R, 118R, 122R and 124R. It will be noted that this position can also be described as one in which the red image 116R of bar 116 is centered with respect to the green images 116G, 118G 122G and 124G. Under these conditions, the image appearing in the microscope will appear as in FIG. 5. This is a second or final reference position for distance calibration of the microscope and an end-of-measurement distance reading is taken here. This type of alignment of the sheared images at the beginning and end of the measurement is sometimes referred to as a double shear mode of operation. When the image shearing mechanism to as a double shear mode of operation. When the image shearing mechanism of the microscope is advanced from the alignment of FIG. 4 to the alignment of FIG. 5, the image is translated by twice the distance "A". This is because calibration reference line 132R of the red image is a distance "A" to the left of calibration reference line 132G of the green image in the initial reference position (FIG. 4) and the calibration reference line 132R of the red image is a distance "A" to the right of calibration line 132G of the green image in the final reference position (FIG. 5). Consequently, from the known distance "A", the calibration of the measuring microscope can be established by comparing twice "A" with the difference between the end-of-measurement distance reading. In order to simplify measurements made in a double shear mode, a microscope may be provided with a setting which divides the actual distance the sheared image translates by two in order to provide a readout which properly reflects the dimension of the feature of the image which was double sheared. Use of such a readout mode eliminates the need to divide the readout by two. For simplicity in the remainder of the discussion, it will be assumed that the microscope is operated in a double shear or divide-bytwo mode (which allows direct comparison between the readout and the calibration dimension of the reticle). The calibration established by the above procedure is of high accuracy and is readily repeatable because a greatly increased visual resolving repeatibility on the part of an operator results from the utilization of a calibration reticle pattern requiring centering of one image within another in an interlocking manner, rather than butting the edges of the two patterns against each other. Utilizing a calibration reticle of this type, a Vickers model 41 photoplan microscope with an image splitting module was calibrated for distances "A" of 200, 400, 600, 800 and 1,000 microinches. The repeated individual calibration readings which were taken during the calibration of this microscope varied by only one microinch for a given distance "A", even when the readings were taken by different operators. Thus, the calibration reticle of this invention allows accurately repeated settings of the image and substantially eliminates variations in operator judgment as a cause of error in the calibration of a measuring microscope. This accurate repeatability of the setting of the image is achieved even if the image is slightly out of focus because the interlocking of slightly fuzzy images can be accurately achieved since it is only necessary to center the interlocked bars with respect to each other rather than it being necessary to determine where the edges of the bar are. Thus, the calibration reticle of this invention achieves a substantial advance in the art of calibrating measuring microscopes.

Referring once again to FIG. 3, the calibration images 190 and 195 are similar to the calibration pattern 110 except that they are for the dimensions B and C which are less than A and may preferably be 0.8A and 0.6A, respectively.

The calibration image 210 is similar to calibration image 110, but has a calibration dimension D which may preferably be 0.4A. For clarity in the drawing image 210' which is a positive of the pattern 210 will be discussed here. Image 210' differs from image 110' because in addition to the certification bars 212' and 214' which correspond respectively to the certification bars 112' and 114' of image 110', an additional certification bar 211' has been added. Additional bar 211' allows increased calibration resolution where the dimension D is the smallest dimension certifiable by the National Bureau of Standards (presently 0.2 mil). It will be noted that the width of bars 211', 212' and 214' in the direction 107 is ½ D. Consequently, a bar 213' of opposing constrast and having a width equal to ½ D in the direction 107 separates bar 212' from bar 214'.

A distance equal to D is calibrated by centering first the green image of bar 216' with respect to the red images of bars 216', 218' 222' and 224', zeroing the measurement mechanism and then centering the green image of the bar 224' with respect to the red image of 216' and 224'. Similarly, a distance equal to ½ D is calibrated by centering the green image of calibration bar 212' with respect to the red images of bars 212' and 214', zeroing the measurement mechanism and then centering the green image of the bar 214' with respect to the red images of the bars 212 and 214'.

A distance equal to ¼ D is calibrated by interlocking the green image of bar 216' with the red images of bars 216', 218', 222' and 224' zeroing the measurement mechanism and then translating the images until the green image of bar 212' is interlocked with respect to the red images of bars 212', 211' and 214'. Thus, a dimension equal to one quarter of the National Bureau of Standard's minuminum certifiable dimension can be calibrated. Further, a distance equal to ⅜ D is calibrated by interlocking when the green image of bar 216' with respect to the red images of bars 216', 218', 222' and 224', zeroing the measurement mechanism and then translating the images until the green of bar 214' is interlocked with the red images of bars 212', 211',218' 214'.

Calibration image 310' is similar to calibration image 110', but is designed to calibrate a microscope to a distance "E" which is less than "A" and may preferably be 0.2A. Image 310' differs from image 110' because there are no bars in image 310' which correspond to the certification bars 112' and 114' of image 110' and because of the inclusion of additional bars 330', 332' and 334' having the same contrast as to bars 318', 322' and 324', and additional bars 331', 333', and 335' of opposing contrast. The additional bars 330', 332' and 334' have been added because the smallness of the distance E results in an image in a microscope eyepiece which is small enough that it can introduce operator error in centering a single green bar 316G' with respect to a single set of red bars 316R', 318R', 322R' and 324R'. The additional bars 330', 332' and 334' provide for the interlocking of a plurality of green bars with respect to a plurality of red bars. This tends to increase operator resolution and thereby mnimizes calibration errors resulting from the smallness of the image.

The lower portion of a calibration pattern 110 includes transparent bar 152 which is a continuation of bar 122 and transparent bars 146, 148 and 154 which together surround a bar 150 of opposing contrast which is preferably opaque. The positions of the bars 146, 148, 152 and 154 which are below squares 144 are similar to the positions of the bars 116, 118, 122 and 124, respectively, shows bars 144, since these bars are spaced from the same calibration reference lines 130, 132, 134 and 136. However, the bars 146, 148, 152 and 154 in the lower portion of pattern 110 are preferably spaced from the lines-of-division by a common distance "K" which is different from common distance "H". The common distance "K" is preferably slightly greater than the distance "H", with the result that the bars 146, 148, 152 and 154 are slightly narrower than bars 116, 118, 122 and 124. Slightly narrower bars are preferred in the calibration pattern for filar microscopes as compared to the calibration pattern for image shearing microscopes because it is considered desirable to have a properly aligned hairline appear to lie adjacent to diagonally adjacent bars of the calibration pattern which are on opposing sides of the hairline. In addition to the preferably different common distance "K", each of the bars 146, 148, 152, and 154 differs from the corresponding bars 116, 118, 122 and 124 of the upper portion of pattern 110 in that in each of the bars of the lower portion of pattern 110 there is preferably an identical shallow rectangular notch in each edge which is parallel to common line 132. In bar 152, these notches are identified by the reference numeral 160. The notches in bar 146, have been designated 162, while the notches in bars 148 and 154 have been designated 164 and 166, respectively. The notches 160, 162, 164 and 166 are designed to provide a visual aid to an operator attempting to center the hairline of a filar eyepiece along the line 132 or 134.

The calibration of a filar microscope is similar in many respects to the calibration of an image shearing microscope. However, it is preferred that the lower portion of pattern 110 be utilized when calibrating a filar microscope. A filar eyepiece is one which includes a movable hairline and generally includes a plurality of (vertical) reference rulings which extend parallel to the hairline and a single horizontal ruling which connects the vertical rulings. For substage illumination, the positive calibration pattern 104 is preferably utilized for calibrating a microscope having a filar eyepiece. The calibration patterns of positive segment 104 have been identified with numerals which are the same as those used with respect to negative segment 102 with the addition of a prime (') to each number to identify it as referring to an element of the positive pattern 104. To calibrate a filar eyepiece microscope, the horizontal ruling is first aligned parallel to orientation bar 107 to assure that the calibration reticle is properly oriented with respect to the microscope measuring system. Then as an intial measurement reference position the hairline of the eyepiece is centered along the calibration line 132' between bar 146' and bars 152' and 148' and the measuring system is zeroed or the beginning-of-measurment reading taken with the hairline in this initial reference position. Next, as a final measurement reference position, the measuring system is adjusted to align the hairline with the calibration reference line 134' between bars 152' and 148' and bar 154' and a final position reading is taken. In each of the positions where the hairline is centered along one of the lines-of-division 132' or 134', a small quantity of light will pass through the small rectangular notches along the edges of the bars which define the location of the calibration reference line along which the hairline is centered. The light from the notches will not be entirely blocked by the hairline and in consequence, by adjusting the position of the hairline to equalize the quantity of light passing through the notches 160' and 164' (in bars 152' and 148', respectively) with the quantity of light from the notches 162' or 166' (in bars 146' and 154', respectively), the hairline can be accurately aligned along the calibration reference line 132' or 134', respectively. Although the calibration pattern has been illlustrated with the areas 146' and 152' having identical values, this is not necessary for calibrating a filar eyepiece and the area 150' need not have the same contrast value as the areas surrounding the areas 146' and 152', so long as the differences in contrast clearly define calibration reference line 132'. The centering of a hairline 600 along the calibration reference line 132' is illustrated in FIG. 6.

The hairline alignment techniques of this invention which centers the hairline between features of the calibration pattern substantially reduces the amount of operator judgment required as compared to prior art calibration reticles. Further, the distance over which operator judgment must be exercised when calibrating a filar microscope is reduced as compared to prior art calibration reticles. Consequently, hairline centering is substantially more repeatable by an individual operator and from operator to operator when a calibration reticle in accordance with the invention is utlized. Thus, the accuracy and uniformity of calibration is substantially increased. This increase in the accuracy of alignment of the hairline is achieved even if the bars have poor edge definition or the image is slightly out of focus because the operator does not need to determine where the edge of a calibration marking is but rather need only to determine when the hairline is centered with respect to two calibration reference bars.

The lower portion of each of the calibration images, 190, 195, 210 and 310 is similar in layout and construction to the lower portion of the calibration image 110. In the lower portion of image 310, the use of additional bars which was described with respect to the upper half of the image 310 is continued.

Although the lower portion of the calibration pattern is primarily intended for use in calibrating filar microscopes, this portion may be utilized during the calibration of an image sharing microscope, if desired. In such event, the event of the notches 150, 152, 164, and 162 will depend on whether the positive or negative pattern is being utilized. However, the notches do not detract from the ability of the operator to center the green images of the bars 146 and 154 with respect to the red images of the bars 146, 148, 152 and 154 and some operators may fine the notches an aid to the centering of the green image with respect to the red images.

In order to center the green image 116G of bar 116 with respect to the red images 116R, 118R, 122R and 124R of bars 116, 118, 122 and 124 it is not essential that the lower edge of bar 118 and the upper edges of bars 116 and 124 be spaced from a line-of-division 138 by the common distance "H", however, such a relationship between the bars is preferred because it aids in the centering of the green image of the bar 116 or 124 with respect to the red images of the bars 116, 118, 122 and 124. Further, and possibly more important, such a relationship among the bars provides a visual check on the proper orientation of the calibration reticle with respect to the image shearing mechanism of a microscope thereby assuring that the displacement of the image during calibration is parallel to the direction 107. Proper orientation of the reticle with respect to the image shearing mechanism is important because to achieve accurate calibration the image must be displaced parallel to the direction 107 during calibration i.e. by the shortest distance which allows the images to be interlocked. As illustrated in FIG. 7, if direction 107 of the calibration reticle is not oriented parallel to the direction of motion of the image shearing mechanism, the sheared red image and green images will be displaced relative to each other in a direction having a component perpendicular to direction 107. Under these circumstances, rather than the green image of bar 116 appearing centered with respect to the red images of the bars 116, 118, 122 and 124, the displacement of the two images leaves a void 712 between the green image of bar 116 and the red image of bar 122. Void 712 appears black in the image. A white bar 714 of the same size as black void 712 appears where the green image of bar 116 overlaps the red image of bar 118. Similarly, a block void 716 appears where the green image of bar 118 is spaced from the red image of bar 124 and a white bar 718 appears where the green image of bar 122 overlaps the red image of bar 124. In addition, a small portion 720 of the green image of certification bar 112 appears at the end of the white image generated by the overlap of the green image of certification bar 112 and the red image of certification bar 114. Thus, where the lower edge of bar 118 and the upper edge of bars of 116 and 124 are spaced by a line-of-division by a common distance "H", the calibration image itself provides assurance that the calibration reticle is properly oriented with respect to the image shearing mechanism.

Quick-calibration-change-detection segment 106 of reticle 100 includes four sets 450, 460, 470 and 480 of position defining bars. Segement 106 is intended for use with filar eyepieces. Each of these sets of bars define positions in a manner analogous to the manner in which the bars in sections 102 and 104 of the reticle define positions. These bars are intended for use in performing a quick calibration check for filar eyepieces at the begining of a work day to assure that the microscope calibration has not changed as a result of a lens substitution or other microscope changes. The intervals F and G between the bar sets 460 and 470 and 450 and 480, respectively are many times longer than the calibration distances provided by the patterns 102, 104, and 106. Consequently, any component substitution affecting the calibration of the microscope will be easily detected because of its cumulative nature by checking the known distances F and G. Consequently, the calibration of a filar eyepiece microscope can be verified without the time consuming process of taking multiple readings on the small dimensions of the calibration images 102 and 104.

A solid reflective object which is opaque to visible light may appear to have a different size when viewed by substage illumination that it does when viewed by surface illumination. As a consequence of this effect, a calibration reticle having transparent bars 116, 118, 122 and 124 surrounded by an opaque reflective area which when illuminated by substage illumination generates the sheared image illustrated in FIG. 4 may when illuminated by surface illumination generate an image like that in FIG. 8. When substage illumination is turned off and surface illumination is turned on, the apparent colors in the image reverse because in both the red image and the green image what was dark now becomes bright becuase the opaque areas (dark by substage illumination) now are bright because they reflect and because the transparent areas (bright by substage illumination) now are dark because they do not reflect. Wherever a bright green area overlaps a bright red area the image is white. Wherever a bright green area overlaps a dark area in the red image the image is green. Wherever a bright red area overlaps a dark area in the green image the image is red. Wherever a dark area in the green image overlaps a dark area in the red image the image is black. Thus, red becomes green, green becomes red, black becomes white and white becomes black and the area of overlap between bars which appears green and a bar which appears red becomes black instead of white. In the image of FIG. 8, when the red image 116R of bar 116 is centered within the green images 116G, 118G, 122G and 124G, the red image 116R is surrounded by a black border 810. Concurrently the green image 124G of bar 124 is surrounded by a similar black border and the red image of bar 122 is spaced from the green image of bar 122 by a black line 812.

Some operators may find an image such as that in FIG. 4 in which the green image 116G of bar 116 just fits the space among the red images 116R, 118R, 122R and 124R easiest to use for calibration of a microscope. Other operators may find an image similar to that in FIG. 8 in which the centered bar is surrounded by a black border easiest to use in calibrating a microscope. Still other operators may prefer an image in which the centered bar is surrounded by a white border. Each of these images can be provided by a proper selection of the common distance H, which can be negative (i.e. bars 116 and 118 may be joined at their adjacent corners.

Although a checkerboard-like pattern of rectangular areas is preferred for a calibration reticle in accordance with this invention, it will be understood that many other patterns may be utilized. Some illustrative alternative patterns which may be utilized are presented in FIGS. 9 and 10.

The pattern of FIG. 9 comprises alternating squares 912 and 914 of opposing contrast. Each square has a circular area of opposed contrast at its center. Thus, an opaque circle 916 is centered within transparent square 912 and a transparent circle 918 is centered within each opaque square 914. Calibration of an image shearing microscope utilizing the calibration pattern of FIG. 9 is performed in a manner similar to that in which calibration is performed with the preferred calibration patterns 102 of FIG. 3. Notches 919 in the sides of opaque squares 914 allow calibration of a flair microscope to be achieved in a manner essentially identical to that utilized with the calibration patterns of FIG. 3.

The calibration pattern of FIG. 10 comprises a nested pattern of squares of opposing contrast interspersed in checkerboard-like pattern with similar squares in which the contrast has been reversed. Thus, squares 1012, 1014 and 1016 are opaque while squares 1013 and 1015 are transparent and squares 1023 and 1025 of the reversed contrast pattern are apaque. Calibration of an image shearing microscope is obtained by aligning the images of opposing colors to form alternate red and green square bands of color centered with respect to each other. Calibration of a filar microscope is achieved in a manner similar to that utilized with the calibration reticle of FIG. 3. Notches 1030 are provided in the outsides of the vertical portions of opaque bands 1016 to aid in alignment of the hairline of a filar eyepiece for calibration of distances in the direction 107. It is preferred that the hairline be centered with respect to the line-of-division between the bands 1016 of diagonally adjacent squares. Notches 1031 in the horizontal portions of square bands 1016 allow calibration of a filar microscope in direction 108 which is perpendicular to direction 107. Thus, if measuring microscopes are developed which can simultaneously measure displacement in two perpendicular directions, those microscopes can be calibrated in both directions simultaneously utilizing the pattern of FIG. 10 It will be noted that most calibration patterns can be designed to allow calibration in two perpendicular directions.

The calibration reticle of this invention is preferably prepared on a glass slide having an adherent opaque reflective chromium film disposed thereon. The reticle is prepared through photomasking and etching technique well known in the art.

The problem of calibration lines which have varying widths or ragged edges is substantially minimized by the use of a calibration pattern which is formed by etching, rather than by scribing. Modern photomasking and etching techniques utilized in the semiconductor industry can produce calibration patterns in accordance with this invention which have bars with straight, well-defined edges even when viewed at magnification normally utilized with measuring microscopes.

It has become standard in the art of semiconductor device manufacture to generate mask patterns that are ten times the size of the final mask and then photographically reduce the mask pattern by a factor of 10 in fabricating the mask. The photoreduction by a factor of 10 reduces any errors in linewidth and center to center position by a factor of 10. This provides partial compensation for any errors generated by the pattern generator which is utilized in making the mask. In order to obtain extreme accuracy in the calibration reticle of this invention, it is preferred to generate a mask pattern for the reticle which is 100 times the size of the final reticle and to photoreduce the mask pattern by a factor of 100. The reduction by a factor of 100 is preferably performed in two successive steps involving reduction by a factor of 10. In this manner, errors generated by pattern generators are reduced to the point where they are vanishingly small for calibration purposes.

Pattern generation machines having a maximum error of 50 microinches are commercially available. Since this error is noncumulative and any error in the original mask pattern is reduced by a factor of 100 during photoreduction of the mask pattern, the maximum error in the final mask is limited to 0.5 microinch with respect to the location of the bars which constitute the reticle. When the photomasking and etching techniques utilized in defining the chrome on the actual calibration reticle are competently performed, the reproduction process will not alter the center to center spacing of the bars. Similarly, this process will not alter the spacing between the left-hand edge of one bar and the left-hand edge of the next succeeding bar since any processing change which increases (or decreases) the width of an opaque bar will increase (or decrease) the width of all opaque bars in equal amounts. Thus, the center to center and left-hand edge to left-hand edge distances are maintained constant. Over etching can result in an increase in the width of the space between diagonally adjacent opaque bars such as bars 118, 124 and 122. That is, the distance H may change. Similarly, under etching can result in the width of the space between opaque bars 118, 122 and 124 being reduced. However, reticles having sufficient over or under etching that thay stand to induce calibration errors are easily eliminated during quality control inspection. Since a large number of production reticles are produced from the same master mask, this large number of reticles will have identical center-to-center bar spacing and the same calibration distances will apply to each reticle made from the same master mask. Consequently, certification of one reticle by the National Bureau of Standards makes each other reticle produced from the same master mask traceable to the National Bureau of Standards and eliminates the need to individually calibrate each reticle.

The calibration reticle of this invention provides a substantial improvement over prior art calibration reticles and accomplishes a substantial advancement in the measuring microscope art since it allows calibration of measuring microscopes to a tolerance which substantially reduces or eliminates the problem of a producer and a customer disagreeing about whether an article such as a mask meets specifications. That is, where the customer specifies the dimensions as measured utilizing the calibration reticle of this invention as the calibration standard, a mask which the mask fabrication facility measures as having line widths which are near to those specified and well within tolerance will also be measured as being within tolerance by the customer. In this manner, substantial delays, misunderstandings and material waste can be eliminated.

Although the description of the preferred embodiment has been with respect to a specific arrangement of calibration bars, it will be understood, that the important feature of the calibration pattern for image shearing microscopes is that the calibration pattern be such that the sheared image can be interlocked in a manner which simplifies the problem of accurately and repeatably setting the microscope to first and second reference positions thereby enabling accurate and repeatable calibration of the measuring mechanism of the microscope, largely independent of otherwise required meticulous focus conditions.

Thus, different patterns of bars which interlock in differing manners than those which have been discussed may be utilized for the calibration patterns.

With respect to the calibration pattern for filar microscopes, the important feature of the calibration pattern is that it be such that the hairline of the filar microscope may be centered between features of the calibration pattern in determining first and second reference positions rather than requiring that the hairline be placed along the edge of a feature of the calibration pattern which does not result in the hairline being centered with respect to features of the pattern.

It will be apparent that those skilled in the art will be able to vary the preferred calibration patterns without departing from the scope of the invention. The preferred embodiments are illustrative only and not limitive. Consequently, the protection afforded the invention is limited only the appended claims.

What is claim is:

1. A calibration reticle for a measuring microscope comprising:
   a plurality of areas of s first contrast value;
   a plurality of areas of a second coantrast value, said second contrast value different from said first contrast value;
   said areas of said first and second contrast values arranged to establish within said calibration reticle at least two parallel, calibration reference lines spaced from each other by a known distance;
   each said calibration reference line defined with respect to at least two boundary lines from which it is equidistant;
   each said boundary line defined by a portion of the boundary between an area of said first contrast value and an area of said second constrast value, said at least two boundary lines with respect to which a given calibration reference line is defined comprising:
   a first boundary line defined by a portion of a boundary between
      a first localized region which has said first contrast value, at least substantially all of said first localized region being on a first side of said given calibration reference line, and
      a second localized region which has said second contrast value, at least substantially all of said second localized region being on a second side of said given calibration reference line; and
   a second boundary line defined by a portion of a boundary between
      a third localized region which has said first contrast value, at least substantially all of said third localized region being on said second side of said given calibration reference line, and
      a fourth localized region which has said second contrast value, at least substantially all of said fourth localized region being on said first side of said given calibration reference line.

2. The calibration reticle recited in claim 1 wherein:
   said calibration reference lines are straight lines;
   said at least two boundary lines are straight lines;
   said first boundary line is defined by a straight line portion of said boundary between said first and second localized regions; and said second boundary line is defined by a straight line portion of said boundary between said third and fourth localized regions.

3. Th calibration reticle for a microscope recited in claim 2 wherein:
   each of said areas of said first contrast value is a bar having at least a first portion thereof of a uniform first width in a first direction; and
   each of said areas of said second contrast value is a space between said bars having at least a first portion thereof of a uniform second width in said first direction.

4. The calibration reticle recited in claim 2 wherein said first boundary line is also defined by a straight line portion of a boundary between
   a fifth localized region which has said first contrast value, at least substantially all of said fifth localized region being on said first side of said given calibration reference line, and
   a sixth localized region which has said second contrast value, at least substantially all of said sixth localized region being on said second side of said given calibration reference line.

5. The calabration reticle recited in claim 2 wherein a first set of said first and second areas are substantially rectangular and said areas of said first set of said first contrast value are interspersed in a checker-board-like pattern with said areas of said second contrast value.

6. The calibration reticle recited in claim 2 wherein said boundary between said first localized region and said second localized region includes a further straight line portion which also defined said first boundary line, said further straight line portion spaced from said straight line portion, along said first boundary line by an additional portion of said boundary which is displaced from said first boundary line in a direction perpendicular to said given calibration reference line to form a notch in at least one of said first and second localized regions.

7. The calibration reticle recited in claim 2 wherein each of said calibration reference lines is substantially adjacent to the boundary lines with respect to which it is defined.

8. The calibration reticle recited in claim 7 wherein said first and second boundary lines with respect to which a given calibration reference line is defined are co-linear, and said given calibration reference line is co-linear with said co-linear first and second boundary lines.

9. A method of calibrating a measuring microscope having a filar eyepiece, said method comprising:
   placing a reticle containing a calibration pattern in said field of view of said microscope and at least substantially in focus, said calibration pattern comprising a plurality of areas of a first contrast value, a plurality of areas of a second contrast value, a plurality of areas of a third contrast value and a plurality of areas of a fourth contrast value, said second contrast value different from said first contrast value, and said fourth contrast value different from said third contrast value, said areas of said first, second, third and fourth contrast values arranged to establish within said calibration reticle at least two parallel, straight, calibration reference lines spaced from each other by a known distance, each said calibration reference line defined with respect to at least two boundary lines from which it is equidistant, a first said boundary line defined by a portion of the boundary between an area of said first contrast value and an area of said second contrast value, a second said boundary line defined by a portion of the boundary between an area of said third contrast value and an area of said fourth contrast value, said first boundary line defined by a straight line portion of a boundary between (1) a first localized region which has said first contrast value, at least substantially all of said first localized region being on a first side of said given calibration reference line and (2) a second localized region which has said second contrast value, at least substantially all of said second localized region being on a second side of said given calibration reference line, and said second boundary line defined by a straight line portion of a boundary between (1) a third localized region which has said third contrast value, at least substantially all of said third localized region being on said second side of said given calibration reference line and (2) a fourth localized region which has said fourth contrast value, at least substantially all of said fourth localized region being on said first side of said given calibration reference line;
   selecting as a first calibration reference position a first calibration reference line established by said calibration pattern;
   selecting as a second calibration reference position a second calibration reference line established by said calibration pattern, said second calibration reference line being diffeent than said first calibration reference line;
   while viewing said calibration pattern through said microscope:
      centering the hairline means of said filar eyepiece in said first calibration reference position to align said hairline means with said first calibration reference line;
      translating said hairline means relative to the image of said calibration pattern and centering said hairline means in said second calibration reference position to align said hairline means along said second calibration reference line; and
   comparing the distance transversed during said translating as measured by said microscope against the known distance actually traversed as defined by said calibration pattern in order to establish the actual calibration of said microscope.

10. The method recited in claim 9 wherein said first contrast value is the same as said third contrast value and said second contrast value is the same as said fourth contrast value.

11. A method of calibrating an image-shearing measuring microscope which generates relatively displaceable first and second images of an object in its field of view, said method comprising:
   placing a reticle containing a calibration pattern in said field of view of said microscope and at least substantially in focus, said calibration pattern comprising a plurality of areas of a first contrast value and a plurality of areas of a second contrast value, said second contrast value different from said first contrast value, said areas of said first contrast value interspersed with said areas of said second contrast value; said areas of said first and second contrast value arranged to establish within said calibration reticle at least two parallel calibration reference lines spaced from each other by a known distance;

each said calibration reference line defined with respect to at least two boundary lines from which it is equidistant; each said boundary line defined by a portion of the boundary between an area of said first contrast value and an area of said second contrast value; said at least two boundary lines with respect to which a given calibration reference line is defined comprising (a) a first boundary line defined by a portion of a boundary between (1) a first localized region which has said first contrast value, at least substantially all of said first localized region being on a first side of said given calibration reference line and (2) a second localized region which has said second contrast value, at least substantially all of said second localized region being on the second side of said given calibration reference line, and (b) a second boundary line defined by a portion of a boundary between (1) a third localized region which has said first contrast value, at least substantially all of said third localized region being on said second side of said given calibration reference line and (2) a fourth localized region which has said second contrast value, at least substantially all of said fourth localized region being on said first side of said given calibration reference line;

lecting as a first calibration reference object means an area of said first contrast value in said first image of said calibration pattern;

lecting as a first calibration reference position an area of said first or second contrast value in said second image of said calibration pattern, lecting as a second calibration reference object means an area of said first or second contrast value in one of said first or second images;

lecting as a second calibration reference position an area of said first or second contrast value in the other of said first and second images of said calibration pattern; while viewing said images through said microscope;

centering said first calibration reference object means in said first calibration reference position to align a first calibration reference line in said first image along a second calibration reference line in said second image;

translating said first image relative to said second image and centering said second calibration reference object means in said second calibration reference position to align a third calibration reference line in said first image along a fourth calibration reference line in said second image, either said third calibration reference line being different than said first calibration reference line or said fourth calibration reference line being different than said second calibration reference line, or both; and comparing the distance traversed during said translating as measured by said microscope against the known distance actually traversed as defined by said calibration pattern in order to establish the actual calibration of said microscope.

12. The method recited in claim 11 wherein:

said first reference object means and said first reference position have different contrast values; and said second reference object means and said second reference position have different contrast values.

13. The method recited in claim 12 wherein:

said area of said first contrast value which, in said first image, is selected as said first calibration object means is also selected, in said second image, as said second reference object means; and said area of said second contrast value which, in said second image, is selected as said first calibration reference position is also selected, in said first image, as said second calibration reference position whereby said second and third calibration reference lines are the same and said first and fourth calibration reference lines are the same.

* * * * *